Figure 1:
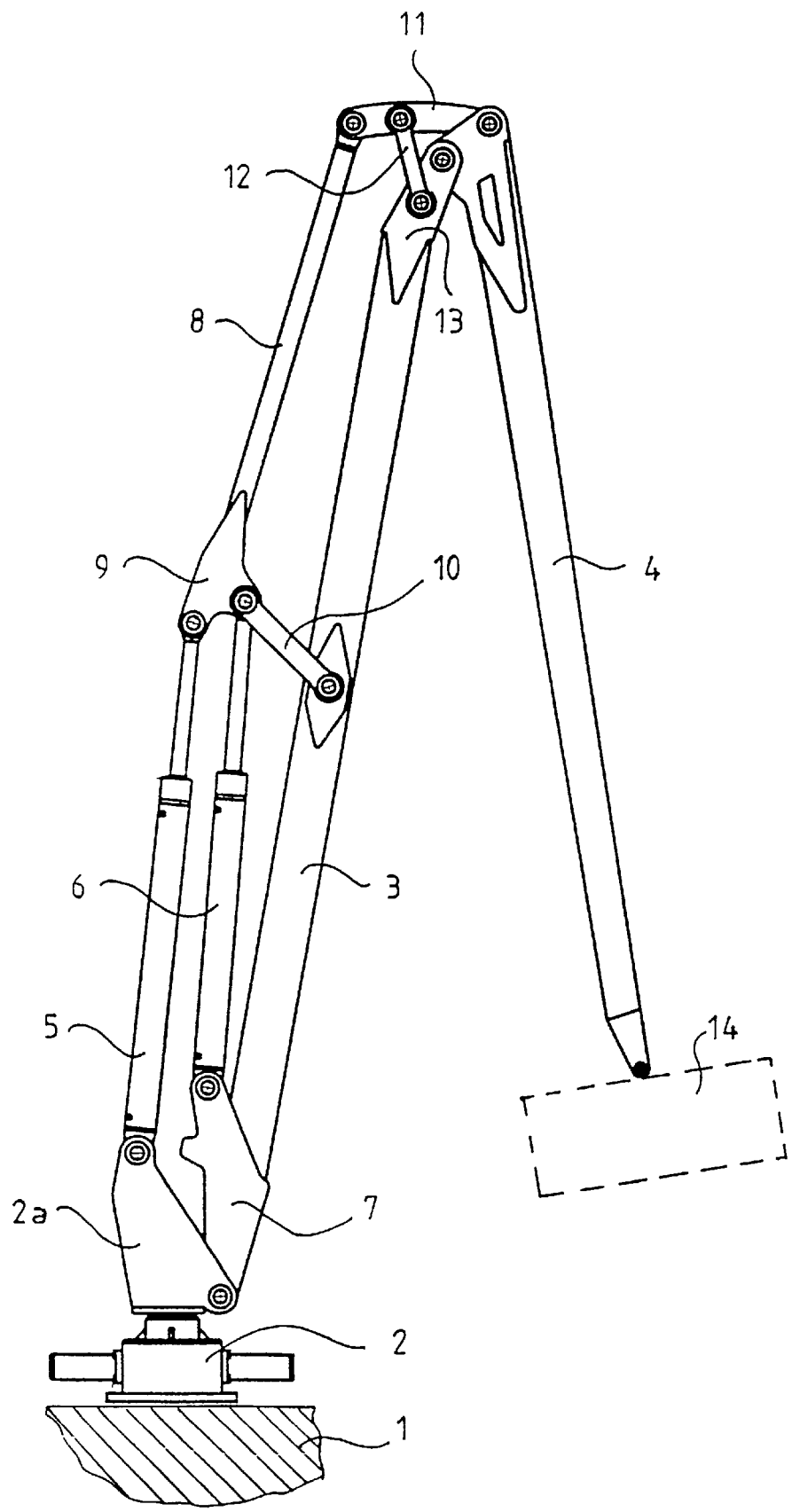

United States Patent

Heikkilä

[11] Patent Number: 6,079,577
[45] Date of Patent: Jun. 27, 2000

[54] LOADER

[76] Inventor: Risto Heikkilä, Asemakatu 1 as 7, FIN-86300 Oulainen, Finland

[21] Appl. No.: 09/180,287
[22] PCT Filed: Apr. 29, 1997
[86] PCT No.: PCT/FI97/00259
  § 371 Date: Oct. 30, 1999
  § 102(e) Date: Oct. 30, 1999
[87] PCT Pub. No.: WO97/41056
  PCT Pub. Date: Nov. 6, 1997

[30] Foreign Application Priority Data

Apr. 30, 1996 [FI] Finland ..................................... 961846

[51] Int. Cl.⁷ ................................................ B66C 23/42
[52] U.S. Cl. ............................ 212/300; 212/238; 212/261
[58] Field of Search ..................... 212/238, 261, 212/300; 414/917

[56] References Cited

U.S. PATENT DOCUMENTS 2,903,142  9/1959  Wills ........................................ 212/238
5,197,615  3/1993  Gunnarson .

FOREIGN PATENT DOCUMENTS 360071    3/1999   European Pat. Off. ................ 212/300
2487317   1/1982   France ..................................... 212/238
1 900 752 8/1970   Germany .
3614720   11/1987  Germany .............................. 414/917
318 382   8/1969   Sweden .
383 991   4/1976   Sweden .

Primary Examiner—Thomas J. Brahan
Attorney, Agent, or Firm—Pillsbury Madison & Sutro

[57] ABSTRACT

A loader composed of: a turntable (2) for connecting said loader to a machine base; a mounting plate (2a) connected to the turntable; a main arm (3) having a first end connected to the turntable; a secondary arm (4) articulated to the main arm (3); a lift cylinder (5) and a maneuvering cylinder (6) for controlling the arms, each of the cylinders having first and second ends, with the first end of the lift cylinder (5) being connected to the mounting plate (2a) and the first end of the maneuvering cylinder (6) being connected to the main arm (3) at a location proximate to the first end of the main arm (3); and a common link plate (9) to which the second end of the lift cylinder (5) and the second end of the maneuvering cylinder are connected in order to control the loader, wherein: the main arm (3), the lift cylinder (5) and the maneuvering cylinder (6) are situated substantially in the same shear plane; and the main arm (3) is positioned between each of the lift cylinder (5) and the maneuvering cylinder (6) and the secondary arm (4).

9 Claims, 2 Drawing Sheets

LOADER

This application is the national phase of international application PCT/f197/00259 filed Apr. 29, 1997 which designated a U.S.

The invention relates to a loader comprising a turntable for connecting the loader to a base machine, a main arm and a secondary arm that are articulated together, the main arm being placed in connection with the turntable, and a lift cylinder and a maneuvering cylinder that control these arms.

Such a loader is used primarily in logging machines. One end of a loader is usually provided with different timber-handling devices, such as a logging head or a harvester part, or a feller head or a grapple for energy firewood. Due to its working area and movement path, such a loader enables the processing and felling of forest either in a selected manner, i.e. by thinning the forest, or in the form of final felling, which means group felling. Loaders are usually attached to a base formed by a logging machine by means of bolts via a collar plate, for example.

It is previously known to use in logging machines a timber loader comprising a separate lift arm and a secondary arm with separate movement paths and hydraulic cylinders that control them, so that the movement paths of these cylinders and arms do not intersect. The movement paths of the lift arm and the secondary arm are thus not connected to each other. When the arms of the loader are used, it is necessary to perform two separate motions simultaneously so that for example a horizontal motion would be provided with the end of the secondary arm within the working area of the arm.

It is also conventional to use telescopic extending means to increase the operating span of the loader. The simultaneous use of extending means and arms is difficult as regards the movement paths, however, and when the loader is used in the near distance such telescopic extending means must be retracted.

When the end of the loader is set to a horizontal motion, it moves jerkily up and down as a result of the separate use of the arms of the known loaders, and not directly and smoothly as would be advantageous for the load or the actuator. Such an uneven movement path increases the consumption of energy of the loader and makes the strains acting on the arms disadvantageously high.

A conventional timber loader further comprises a turntable that is mounted on a logging machine or a base machine and that is provided with a vertical pillar. This vertical pillar is conventionally provided with a lift arm that is guided by a lift cylinder and that is provided at one end with a secondary arm controlled by a rocker cylinder. In order to increase the working area of the loader, the telescopic extending means are placed inside the secondary arm far from the base machine. The centre of gravity of the loaders will thus be situated high and far from the base machine. This weakens the balance of the logging machine, wherefore the machine requires more mass in order to remain stable during the use of the loader.

The stress on the arms formed by the lift arm and the secondary arm is also increased by the point stresses caused by the lift and the rocker cylinder. In conventional loaders, the lift cylinder causes a point stress on the arms since the lift cylinder is usually attached to the arms from only one point. Also, the fastener for the lower end of the rocker cylinder is usually welded to the middle of the lift arm. The arms are generally subjected to fractures that start from the aforementioned points. To prevent the occurrence of such fractures, the manufacturing materials of the arms have usually been strengthened, as much as possible, at the expense of the total weight of the apparatus.

Since the actuating cylinder for the lift arm is usually situated below the lift arm, it is often exposed to blows. When the loader is in the vertical position, the unprotected lift cylinder is easily hit by the end of the secondary arm or a device mounted on its end or a log placed in the device. The distant position of the actuating cylinder of the secondary arm in the arm structure also causes problems since during operations in the forest this rocker cylinder can be damaged during the lifting by a solid obstacle situated in the working environment.

There are thus several problems related to the prior arrangements. It has therefore been difficult to guide the arms since it has been necessary to control two or even three mutually independent movements. Also, the position of the actuating cylinders of the arms has subjected the cylinders to damages occurring during the use. Further, the position of the actuating cylinders has produced harmful point stresses in the loader, thus leading either to fractures in the apparatus or to a heavy arm construction.

The purpose of the present invention is to eliminate the prior art drawbacks and to provide a new type of simpler and more effective construction.

This object is achieved with a loader having the characteristics defined in the claims of the present invention. More precisely, the apparatus according to the invention is mainly characterized in that the lift cylinder is connected from its first end to the turntable by means of a mounting plate, and the maneuvering cylinder is connected from its first end to the end of the main arm on the side of the turntable, and that the other end of the lift cylinder and the other end of the maneuvering cylinder are connected to the same link plate in order to control the apparatus.

In the discussion of the invention, the lift arm and the secondary arm are referred to with the common name 'arms'. The lift cylinder and the maneuvering cylinder guiding the arms are also called actuating cylinders.

The invention provides considerable advantages. In the loader according to the invention, the lift cylinder and the maneuvering cylinder guiding the arms are mounted one on top of the other on the main arm. This provides a narrow structure for the loader, so that the field of vision of the machine operator is better than during the use of the prior apparatuses. Further, the cylinders are positioned close to the base machine and they are thus protected when the loader moves, and they are also situated on the other side of the main arm protected from possible blows from the secondary arm or loads positioned thereon.

Due to the advantageous positions of the actuating cylinders of the loader according to the invention, the loads of the cylinders are distributed to several points in the arms so that the stresses acting on a single part of the arms remain small. For example, the lower fastening of the maneuvering cylinder is preferably integrated with the same fastening means as the main arm, so that the stress caused by the maneuvering cylinder moves only slightly towards the middle of the arms. Further, for example in a loader according to the first preferred embodiment of the invention, the point loading of the lift cylinder is distributed to at least three points in the arms, so that the stresses on the arms remain minimal. When the fastening of the lift cylinder reaches higher than the middle of the length of the lift arm, it decreases the stress on the arms. The lifting movement of the loader preferably subjects the main arm to compression and not to harmful deflection or tension as usual.

By arranging the main arm to start from a low position without a separate vertical pillar in the loaders according to the invention, the centre of gravity of the apparatus can be provided advantageously near the base machine and the total construction of the apparatus is also made low. The low construction is also advantageous since it provides the operator of the machine with a clear field of vision.

The movement path of the loader according to the invention is ideal since the horizontal transfer movement of the apparatus within the entire working area of the apparatus is carried out by using only one cylinder, i.e. the maneuvering cylinder, so that the movement of the loader is very smooth. The angles of the main arm and the secondary arm remain substantially the same with respect to the vertical plane within the entire working area of the arms, so that the centre of gravity of the loader is always as close to the point of fastening and the base machine as possible.

The maneuvering cylinder guiding the loader moves the end of the arms along a substantially direct line in the working area of the loader. The lift cylinder of the apparatus in turn only performs the lifting motion of the arms, so that the movements of the loader are easy to control. By means of the control system according to the invention, the path to the target is the shortest possible so that energy is saved and the loader is subjected to as small stresses as possible. Since the loader is thus subjected to a smaller strain than in the known apparatuses and since the actuator means of the loader are positioned more advantageously with respect to one another than in the prior arrangements, the structure of the loader is light. During its use such a loader according to the invention is estimated to reduce the consumption of energy about 20% compared to the prior arrangements, and it is also estimated to be about 20% faster in use.

The transfer movement of the loader that is brought about by the maneuvering cylinder and that is directed outwards and inwards has preferably the same transfer force in both directions since the small compression force of the maneuvering cylinder is increased by the weight of the arms when they are lowered to a straight position.

Figure 2:
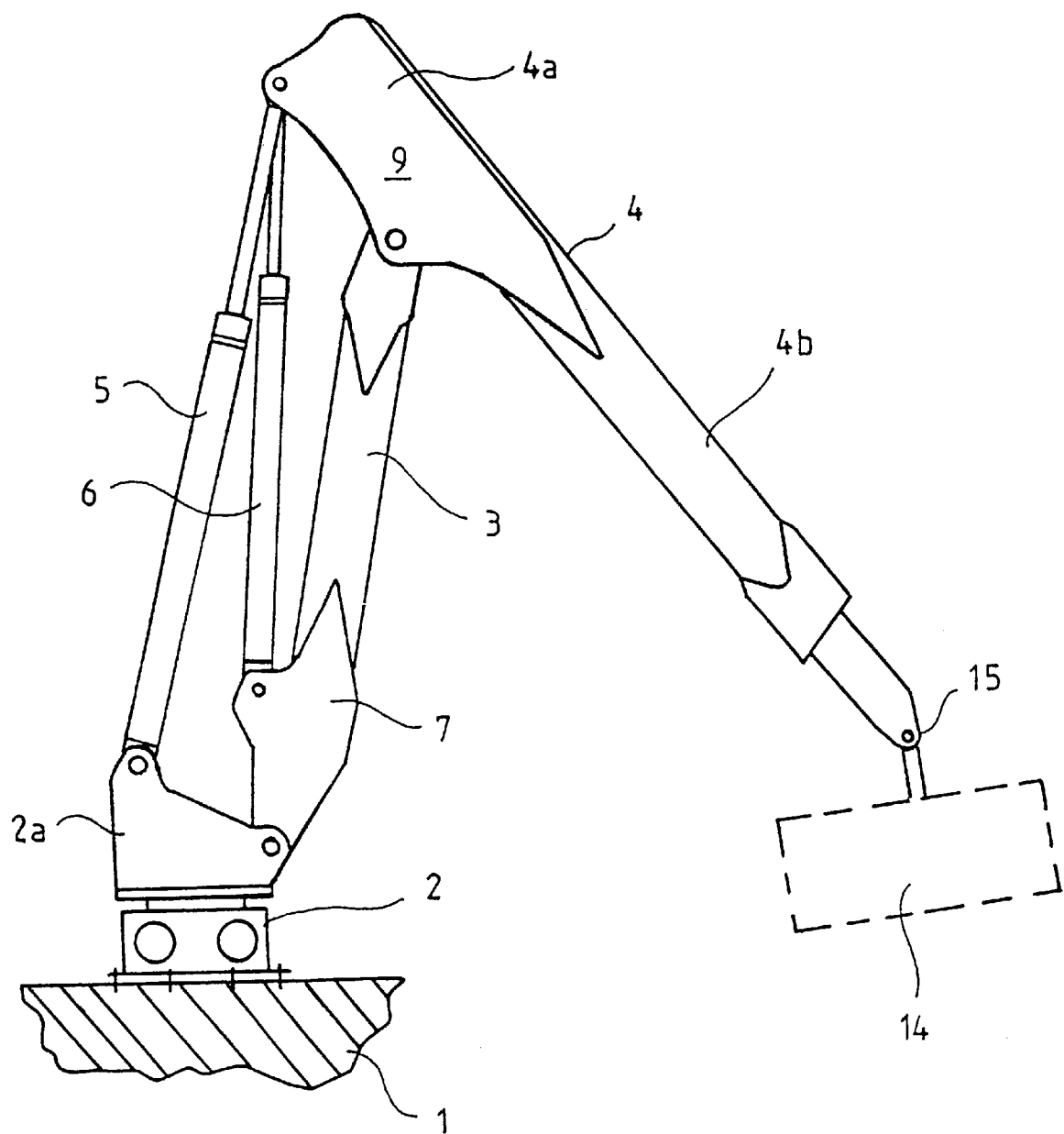

In the following, the invention will be described with reference to the accompanying drawing, which shows preferred embodiments of the loader according to the invention and in which FIG. 1 shows a first embodiment of the invention where the actuating cylinders are attached to the arms via a guide bar and link arrangement. and FIG. 2 shows another embodiment of the invention where the actuating cylinders are attached from one end only to the secondary arm.

A loader according to the invention comprises a turntable 2 that is rotatably mounted on a frame of a logging machine, i.e. a base machine 1. The arms of the apparatus are fastened on the turntable via a mounting plate 2a, the arms comprising a main arm 3 and a secondary arm 4. The arms are controlled by two actuating cylinders, i.e. a lift cylinder 5 and a maneuvering cylinder 6. The lift cylinder is positioned on the opposite side of the main arm 3 with respect to the secondary arm 4 substantially in parallel with the main arm so that the first end of the cylinder is connected to the turntable. The maneuvering cylinder 6 is thus placed between the lift cylinder and the main arm and it is preferably connected to the base of the main arm for example via a mounting piece 7 placed for example at the base of the main arm.

According to the first preferred embodiment shown in FIG. 1, the movement path of the loader is guided by means of a guide bar and link arrangement that is situated in the point of intersection of the main arm and the secondary arm and that is controlled with a stabilizer bar 8 and the main arm 3. In such a case, the lift cylinder 5 is connected to a link plate 9 which in turn is attached to the stabilizer bar 8. The link plate also comprises a rotatably connected auxiliary yoke 10 one end of which is attached rotatably to the main arm 3, preferably to the middle section of the arm. One end of the maneuvering cylinder 6 is connected to this auxiliary yoke preferably such that the point where the auxiliary yoke is attached to the link plate and the point where the maneuvering cylinder is attached to the auxiliary yoke meet in the same pivot.

The stabilizer bar 8 transmits the control movement of the actuating cylinders to the guide bar and link arrangement such that when an articulated rod 11 provided therein is moved with respect to a lever means 12, the control movement is transmitted to the secondary arm 4 connected to one end of the articulated rod.

The main arm 3 in turn transmits the control movement of the actuating cylinders to the guide bar and link arrangement such that a folding plate 13 and one end of the lever means 12 are connected to the end of the main arm. The folding plate thus transmits the control movement to the secondary arm and the lever means transmits the control movement to the secondary arm via the articulated rod.

According to another preferred embodiment of the invention shown in FIG. 2, the movement path of the loader is guided by attaching the lift and the maneuvering cylinder 5 and 6 to the secondary arm from the end opposite to the turntable 2. The secondary arm is then articulated to the main arm such that it continues on both sides of the pivot and forms in the secondary arm a swinging arm 4a situated on the side of the actuating cylinders and a transferring arm 4b connected inflexibly thereto.

Both the lift cylinder 5 and the maneuvering cylinder 6 are then attached to the link plate 9 provided in the swinging arm 4a of the secondary arm. The control movements of the actuating cylinders are transmitted in this arrangement directly to the secondary arm, thus enabling fast and accurate control movements.

In order to improve the working area of such an apparatus, the apparatus can be provided with a telescopically extendible secondary arm shown in FIG. 2, so that a sufficient working area can be provided despite the compact structure of the apparatus.

In the structure of the loaders according to the invention, the distance of the point of fastening of the main arm 3 from the base machine 1 is small due to the low structure of the mounting piece 7 that receives the main arm, and the centre of gravity of the apparatus is therefore near the base machine and the loader thus has a low structure.

Since the lift cylinder 5 and the maneuvering cylinder 6 are positioned substantially in the same shear plane with the main arm 3, the apparatus according to the invention is provided with a narrow structure. When the lift and the maneuvering cylinder are situated near the base machine 1, they are protected when the loader moves, and when they are also positioned according to the invention on the opposite side of the secondary arm 4 articulated to the main arm 3, they are protected from possible blows from the secondary arm or from an actuator 14 connected thereto.

This structure also enables the distribution of the forces of the lift cylinder 5 and the maneuvering cylinder 6 to several points in the arms, so that the stresses acting on the arms remain as small as possible.

When the loader is used, the arms can be straightened or retracted with one control movement. In such a case, for example in the apparatus of FIG. 1 the maneuvering cylinder 6 is arranged to guide a polygon having sides consisting of the stabilizer arm 8, the link plate 9, the auxiliary yoke 10, the end of the main arm 3, the lever means 12 and the articulated rod 11 of the apparatus. When a transfer force is directed at the polygon with the maneuvering cylinder 6 in the longitudinal direction of the cylinder, the angles of the polygon can be made to change so that the main arm and the secondary arm move substantially simultaneously and along an equal distance, i.e. their movements are synchronised. This results in a substantially linear movement path of the end of the secondary arm 4 in the working space. For example, when the distance between the link plate 9 and the turntable is kept constant, i.e. the length of the lift cylinder is not changed but the piston of the maneuvering cylinder is retracted into the cylinder thus reducing the length of the cylinder, the main arm is made to move rotatably towards the base machine. This rotating movement is transmitted to the secondary arm 4, forcing it to rotate a certain angle that equals the angle of rotation of the main arm. Further, the movement of the piston of the maneuvering cylinder in its longitudinal direction produces a rotating movement in the auxiliary yoke 10 and it also produces a control movement that is transmitted via the stabilizer bar 8 and the articulated rod 11 to the secondary arm 4, forcing the end of the secondary arm to either move away or closer to the main arm. The main arm and the secondary arm therefore rotate in proportion as the loader thus extends outwards.

A change in the length of the lift cylinder 5 affects the level of elevation of the end of the secondary arm. Therefore, the movement of the piston of the lift cylinder in its longitudinal direction makes, via the stabilizer bar 8 and the articulated rod 11, the main arm rotate with respect to its base, so that the transition of the end of the main arm together with the movement of the articulated rod lifts or lowers the end of the secondary arm. In this manner, the movement path of the arms and the height of the end of the secondary arm from the base are selected.

The movement path of the loader is made ideal since the transfer movement in the horizontal direction within the entire working area of the loader is only carried out with one cylinder, i.e. the maneuvering cylinder 6, so that the movement of the loader is smooth.

It should be understood that the above description and the related figures are only intended to illustrate the present invention. The invention is therefore not restricted to the embodiment disclosed above and defined in the claims, but several different variations and modifications of the invention, which are possible within the scope of the inventive idea disclosed in the appended claims, will be evident for those skilled in the art.

What is claimed is:

1. A loader comprising:
   a turntable (2) for connecting said loader to a machine base;
   a mounting plate (2a) connected to said turntable;
   a main arm (3) having a first end connected to said turntable;
   a secondary arm (4) articulated to said main arm (3);
   a lift cylinder (5) and a maneuvering cylinder (6) for controlling said arms, each of said cylinders having first and second ends, with said first end of said lift cylinder (5) being connected to said mounting plate (2a) and said first end of said maneuvering cylinder (6) being connected to said main arm (3) at a location proximate to said first end of said main arm (3); and
   a common link plate (9) to which said second end of said lift cylinder (5) and said second end of said maneuvering cylinder (6) are connected in order to control the loader, wherein:
   said main arm (3), said lift cylinder (5) and said maneuvering cylinder (6) are situated substantially in the same shear plane; and
   said main arm (3) is positioned between said secondary arm (4) and both said lift cylinder (5) and said maneuvering cylinder (6).

2. A loader according to claim 1, wherein the loader comprises an auxiliary yoke (10) connected rotatably to the main arm, the link plate (9) being articulated to the auxiliary yoke at a point of articulation, and a stabilizer bar (8) connected to the link plate to control the secondary arm, the lift cylinder (5) and the maneuvering cylinder (6) being connected to the link plate (9), the control movements of the cylinders being transmitted to the main and the secondary arm via the stabilizer bar and the auxiliary yoke.

3. A loader according to claim 2, wherein the first end of the maneuvering cylinder (6) is fastened substantially to the first end of the main arm (3) via a mounting piece (7).

4. A loader according to claim 2, wherein the maneuvering cylinder (6) is attached to the point of articulation of the link plate (9) and the auxiliary yoke (10).

5. A loader according to claim 1, wherein the link plate (9) is provided at the end of the secondary arm situated on the side of the lift cylinder and the maneuvering cylinder, in order to transfer the control movements of the lift and the maneuvering cylinders.

6. A loader according to claim 1 wherein said maneuvering cylinder (6) is positioned between said main arm (3) and said lift cylinder (5).

7. A loader according to claim 6 wherein said lift cylinder (5) and said maneuvering cylinder (6) extend substantially parallel to one another in at least one operating position of said loader.

8. A loader according to claim 1 wherein said first end of said main arm (3) is connected to said turntable (2) via said mounting plate (2a).

9. A loader according to claim 1 further comprising a mounting piece (7) connecting said first end of said main arm (3) to said turntable (2).

* * * * *